(12) United States Patent
Strole (10) Patent No.: US 7,689,295 B2
(45) Date of Patent: *Mar. 30, 2010

(54) METHOD AND SYSTEM FOR MONITORING AND CONTROL OF COMPLEX SYSTEMS BASED ON A PROGRAMMABLE NETWORK PROCESSOR

(75) Inventor: Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 11/942,319

(22) Filed: Nov. 19, 2007

(65) Prior Publication Data

US 2008/0058965 A1 Mar. 6, 2008

Related U.S. Application Data (63) Continuation of application No. 10/607,120, filed on Jun. 26, 2003, now Pat. No. 7,340,312.

(51) Int. Cl.
*G05B 11/01* (2006.01)
*G05B 9/02* (2006.01)
*G06F 15/177* (2006.01)
*G06F 15/173* (2006.01)
*G08B 29/00* (2006.01)

(52) U.S. Cl. .............................. 700/25; 700/17; 700/19; 700/21; 700/79; 709/220; 709/221; 709/224; 709/240; 702/86; 702/186; 340/511; 340/870.1

(58) Field of Classification Search .................... 700/17, 700/19, 21, 25, 180; 709/220–224, 240; 702/86, 186; 340/511, 870.1

See application file for complete search history.

(56) References Cited

U.S. PATENT DOCUMENTS

| | | | |
|---|---|---|---|
| 3,956,615 A | | 5/1976 | Anderson et al. |
| 4,873,655 A | | 10/1989 | Kondraske |
| 5,281,951 A | * | 1/1994 | Okayama .................... 340/511 |
| 5,699,447 A | | 12/1997 | Alumot et al. |
| 5,774,645 A | | 6/1998 | Beaujard et al. |
| 5,802,146 A | * | 9/1998 | Dulman ................... 379/32.03 |
| 5,862,054 A | * | 1/1999 | Li .............................. 700/121 |
| 5,920,705 A | | 7/1999 | Lyon et al. |
| 5,974,349 A | | 10/1999 | Levine |

(Continued)

FOREIGN PATENT DOCUMENTS

JP 04084056 A 3/1992

*Primary Examiner*—Ramesh B Patel
(74) *Attorney, Agent, or Firm*—Yee & Associates, P.C.; Mark E. McBurney (57) ABSTRACT

A method and apparatus for monitoring and control of a system is disclosed. The method and apparatus include providing a plurality of sensors, a table, and a network processor. The sensors monitor attributes of the system. The table includes a plurality of entries. Each of the entries indicates at least one action to be taken in response to a portion attributes having particular values. The network processor is coupled with the sensors and with the table. The network processor receives from the sensors a plurality of statuses for the attributes. The network processor further determines at least one entry of the entries to access based upon the statuses and accesses the at least one entry to determine a corresponding action.

32 Claims, 4 Drawing Sheets

U.S. PATENT DOCUMENTS

| | | | |
|---|---|---|---|
| 6,041,347 A * | 3/2000 | Harsham et al. | 709/220 |
| 6,134,676 A * | 10/2000 | VanHuben et al. | 714/39 |
| 6,144,691 A | 11/2000 | de la Salle | |
| 6,219,597 B1 * | 4/2001 | Longere | 701/29 |
| 6,269,401 B1 * | 7/2001 | Fletcher et al. | 709/224 |
| 6,295,488 B1 * | 9/2001 | Longere | 701/29 |
| 6,311,175 B1 | 10/2001 | Adriaans et al. | |
| 6,487,457 B1 * | 11/2002 | Hull et al. | 700/17 |
| 6,581,022 B2 * | 6/2003 | Murakami | 702/136 |
| 6,812,853 B1 | 11/2004 | Matsui | |
| 6,823,232 B2 | 11/2004 | Murphy | |
| 6,895,244 B2 | 5/2005 | Iyer | |
| 6,909,922 B2 | 6/2005 | Tymchenko | |
| 6,975,635 B2 | 12/2005 | Takeyama et al. | |
| 7,026,929 B1 * | 4/2006 | Wallace | 340/539.13 |
| 7,049,975 B2 * | 5/2006 | Vanderah et al. | 340/870.02 |
| 7,065,213 B2 | 6/2006 | Pinder | |
| 7,215,637 B1 | 5/2007 | Ferguson et al. | |
| 7,308,322 B1 * | 12/2007 | Discenzo et al. | 700/28 |
| 2006/0095146 A1 * | 5/2006 | Hesse et al. | 700/19 |

* cited by examiner

METHOD AND SYSTEM FOR MONITORING AND CONTROL OF COMPLEX SYSTEMS BASED ON A PROGRAMMABLE NETWORK PROCESSOR

CROSS-REFERENCE TO RELATED APPLICATIONS

Under 35 USC §120, this application is a continuation application and claims the benefit of priority to U.S. patent application Ser. No. 10/607,120, now U.S. Pat. No. 7,340,312, filed Jun. 26, 2003, entitled "Method and System for Monitoring and Control of Complex Systems Based on a Programmable Network Processors," all of which is incorporated herein by reference.

FIELD OF THE INVENTION

The present invention relates to computer systems, and more particularly to a method and system for utilizing a programmable network processor for monitoring and control of complex systems.

BACKGROUND OF THE INVENTION

Complex systems that require monitoring and control exist in a variety of technologies. For example, automobiles, aircraft, ships, factories, and power plants are examples of complex systems that include a large number elements. These numerous elements are desired to be monitored and controlled to ensure that the complex system operates as desired. For example, in a nuclear power plant, attributes of the components such as the generation of power, temperature of various components, steam pressure, water pressure, reactor temperature, rod temperature, and reactor output should be monitored to determine whether the power plant is functioning as desired or whether corrective action should be taken.

Various conventional systems might be used to monitor and control complex systems. For example, U.S. Pat. No. 5,862,054 and U.S. Pat. No. 5,774,645 describe systems that monitor attributes of complex systems at various point of the complex system. Data relating to the complex system is forwarded to a central computer system. For example, in the conventional system of U.S. Pat. No. 5,862,054, data relating to processing in a wafer fabrication system is forwarded to a conventional central computer system for analysis. Statistics might be collected on the wafer fabrication system and performance of the wafer fabrication system improved. Similarly, the conventional system described in U.S. Pat. No. 5,774,645 fault cues are provided to a conventional central processing station. The fault cues indicate the origin and nature of the fault. The central processing station can thus aid in diagnosing and correcting faults.

Although conventional methods and systems for diagnosing and correcting faults exist, one of ordinary skill in the art will readily recognize that the demands of a complex system are difficult to meet. In particular, the number of components of a complex system may be extremely large. Furthermore, the attributes of many of these components might be desired to be monitored often. For example, some attributes might be sampled multiple times per second. As a result, an exceedingly large amount of data may be provided to the conventional control systems. Thus, it may be difficult or impossible for conventional systems to analyze the data and diagnose impending failures in a timely manner. Moreover, managers of the complex system might desire to have more information relating to a fault. For example, raw data relating to various attributes around the time of occurrence and location the fault may be desired for analysis.

Accordingly, what is needed is a system and method for more efficiently controlling complex systems. The present invention addresses such a need.

SUMMARY OF THE INVENTION

The present invention provides a method and apparatus for monitoring and control of a system. The method and apparatus comprise providing a plurality of sensors, a table, and a network processor. The plurality of sensors monitors a plurality of attributes of the complex system. The table includes a plurality of entries. Each of the plurality of entries indicates at least one action to be taken in response to a portion of the plurality of attributes having particular values. The network processor is coupled with the plurality of sensors and with the table. The network processor receives from the plurality of sensors a plurality of statuses for the plurality of attributes. The network processor further determines at least one entry of the plurality of entries to access based upon the plurality of statuses and accesses the at least one entry to determine a corresponding action.

According to the system and method disclosed herein, the present invention provides an efficient mechanism for monitoring numerous attributes of systems and controlling the system based on these attributes.

DETAILED DESCRIPTION OF THE INVENTION

The present invention relates to an improvement in the monitoring and control of complex systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and apparatus for monitoring and control of a system. The method and apparatus comprise providing a plurality of sensors, a table, and a network processor. The plurality of sensors monitors a plurality of attributes of the complex system. The table includes a plurality of entries. Each of the plurality of entries indicates at least one action to be taken in response to a portion of the plurality of attributes having particular values. The network processor is coupled with the plurality of sensors and with the table. The network processor receives from the plurality of sensors a plurality of statuses for the plurality of attributes. The network processor further determines at least one entry of the plurality of entries to access based upon the plurality of statuses and accesses the at least one entry to determine a corresponding action.

The present invention will be described in terms of a particular computer systems, particular network processor, and particular complex systems. However, one of ordinary skill in the art will readily recognize that this method and system will operate effectively for other computer systems, other network processors and other complex system. The present invention is also described in the context of particular sensors and particular attributes. However, one of ordinary skill in the art will readily recognize that the method and apparatus operate effectively for other and/or additional sensors measuring other and/or additional attributes.

The present invention is described in the context of a method for accessing one entry of a table. However, one of ordinary skill in the art will readily recognize that multiple entries might be accessed using the method and system in accordance with the present invention. Similarly, the present invention is described in the context of a single network processor and a single table. However, one of ordinary skill in the art will readily recognize that the method and system are consistent with the use of multiple network processors and/or multiple tables.

Figure 1A:
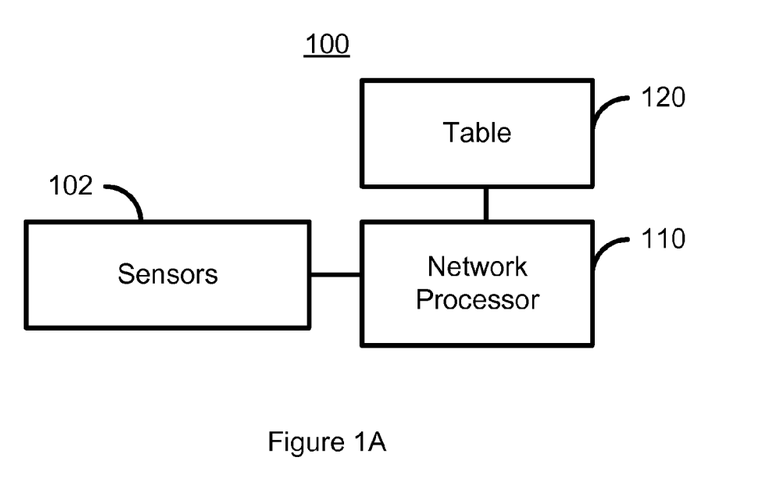
FIG. 1A is a high level diagram of one embodiment an apparatus in accordance with the present invention for controlling a complex system.

To more particularly illustrate the method and system in accordance with the present invention, refer now to FIG. 1A, depicting a high level diagram of one embodiment an apparatus 100 in accordance with the present invention for controlling a complex system. The apparatus 100 is for use in a complex system, such as the examples listed above. However, the apparatus 100 and methods, described below, are applicable to other complex systems (not shown).

The apparatus 100 includes sensors 102, a network processor 110, and a table 120. The sensors 102 are used to monitor attributes of the complex system (not explicitly shown), at various points in the system. For example, the sensors 102 monitor attributes such as temperature, pressure, flow rates, altitude, direction, speed, or location. As can be seed from the examples above, the sensors 102 could monitor a wide variety of attributes, depending upon the complex system in which the sensors 102 are used. Thus, the sensors 102 sample the corresponding attributes at various intervals to determine the statuses of the attributes. In a preferred embodiment, the interval at which the sensors 102 sample the attributes can be programmed. The sensors 102 provide the status of each attribute to the network processor 110. In one embodiment, the statuses of the attribute are provided to the network processor 110 are provided in packets, such as Ethernet packets.

The table 120 preferably includes a lookup table or another mechanism, such as a decision tree, for storing data. Thus, in the context of the present application, a table 120 includes, but is not limited to, lookup tables such as a content addressable memory (CAM) based table and decision trees. The table 120 is used to store actions corresponding to various attributes of the complex system. The entries of the table 120 include one or more actions to be taken in response to attributes of the complex system taking on certain values. The entries of the table 120 are preferably indexed based upon a key. The key might be based upon various information, including the status of the corresponding attribute. The key may be based upon inclusion of an identification of sensors 102 which monitors the status. In addition, the key, as well as the corresponding action, may be based upon multiple attributes from multiple sensors, multiple samples from a single sensor, or some combination thereof. Different values of the key correspond to different entries of the table 120.

The network processor 110 receives the statuses from the sensors 102 and, based upon the statuses, accesses one or more of the entries of the table 120. The network processor 110 is conventionally used in networking applications, such as switches or routers. As such, the network processor 110 is capable of handling millions of packets per second. Furthermore, a network processor 110 is typically configured to perform millions of packet lookups in a decision tree or CAM-based table. The network processor 110 is also typically configured to build a key using fields within the networking packets. In addition, the network processor 110 is already programmable. These capabilities of the network processor 110 are exploited in the context of monitoring complex systems. Thus, a network processor, such as the IBM PowerNP NP4GS3 network processor might be used for the network processor 110.

The network processor 110 is thus programmable and has a rapid table lookup capability. The network processor 110 receives from the sensors 102 statuses of the attributes of the complex system. In a preferred embodiment, the network processor 110 receives the status information in the form of packets, such as Ethernet packets, that are assembled either by the sensors 102 or, in a preferred embodiment, a controller (not shown). However, in an alternate embodiment, the network processor 110 can form the packets or may simply receive raw data relating to the statuses from the sensors 102.

The network processor 110 uses the statuses to determine the entries in the table 120 to access. Based upon the action(s) in the corresponding entries, the network processor 110 may take action or route data to a system processor (not shown), which may take additional action. The network processor 110 preferably determines which entry to access by forming a key. The key is formed based upon the statuses of the attributes and, in a preferred embodiment, the identities and/or types of the sensors 102 which monitor the attributes. In a preferred embodiment, the network processor 110 concatenates various fields of the packets in order to form the key. The fields, and thus the status information, that the network processor 110 uses to form the key are preferably programmable. The network processor 110 preferably uses the key to search the table 120. The network processor 110 accesses the entry corresponding to a value of the key that matches the value of the key built by the network processor. Thus, the action corresponding to one or more specific conditions of the complex system can be determined.

The action stored in the table 120 and determined by the network processor could include a variety of responses, including simply continuing normal operation. For example, the action could indicate that a warning should be issued, that the sensors 102 should monitor certain attributes more frequently or could depend upon other conditions. If the action (termed herein a "dependent condition") depends upon other conditions, then data could be forwarded to a system processor for further analysis. In an alternate embodiment, the network processor 110 could perform at least some additional analysis of the related conditions.

Thus, the apparatus 100 including the network processor 110 and the table 120 can rapidly handle the volume of information obtained from the sensors 102 in monitoring and controlling the complex system. Furthermore, the apparatus 100 can rapidly determine the action to be taken in response to the statuses of the attributes taking on certain values. In addition, multiple statuses from one or more sensor(s) can be combined and used to search for the appropriate action in the table 120. Thus, the actions for conditions corresponding to combinations of statuses can be more rapidly determined. For example, in a particular complex system, an increase in pressure may not be significant unless accompanied by an increase in temperature. Using the apparatus 100, the actions for increases in both pressure and temperature can be rapidly determined in a single search. Such a search would be much more efficient than sequentially testing the pressure and temperature, then determining the appropriate action. As a result, a more efficient mechanism for controlling the complex system based upon combined statuses is provided.

Figure 1B:
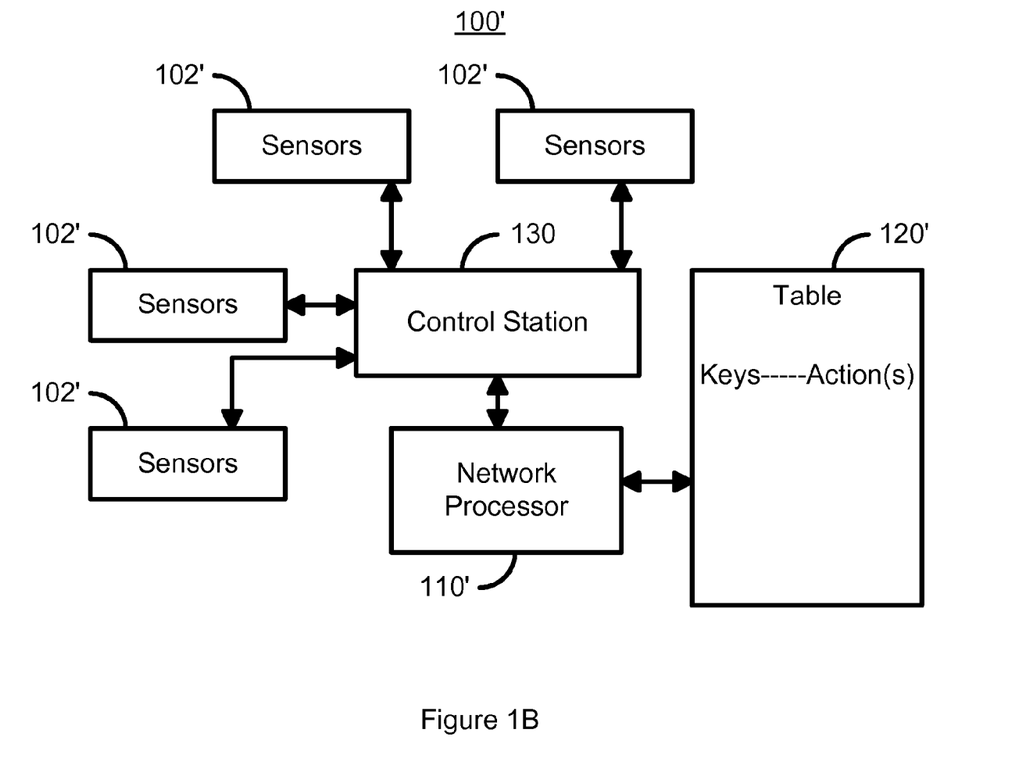
FIG. 1B is a more detailed diagram of a preferred embodiment of an apparatus in accordance with the present invention for controlling a complex system.

FIG. 1B is a more detailed diagram of a preferred embodiment of an apparatus 100' in accordance with the present invention for controlling a complex system. Many of the components of the apparatus 100' are analogous to those of the system 100. Consequently, these components are labeled similarly. For example, the apparatus 100' includes sensors 102', network processor 110', and table 120', which correspond to the sensors 102, network processor 110 and table 120 of FIG. 1A. The sensors 102', network processor 110', and table 120' thus function in an analogous manner to the sensors 102, network processor 110 and table 120 described above in FIG. 1A. Referring back to FIG. 1B, the apparatus 100' also includes a control station 130 coupled with the network processor 110'.

Figure 2:
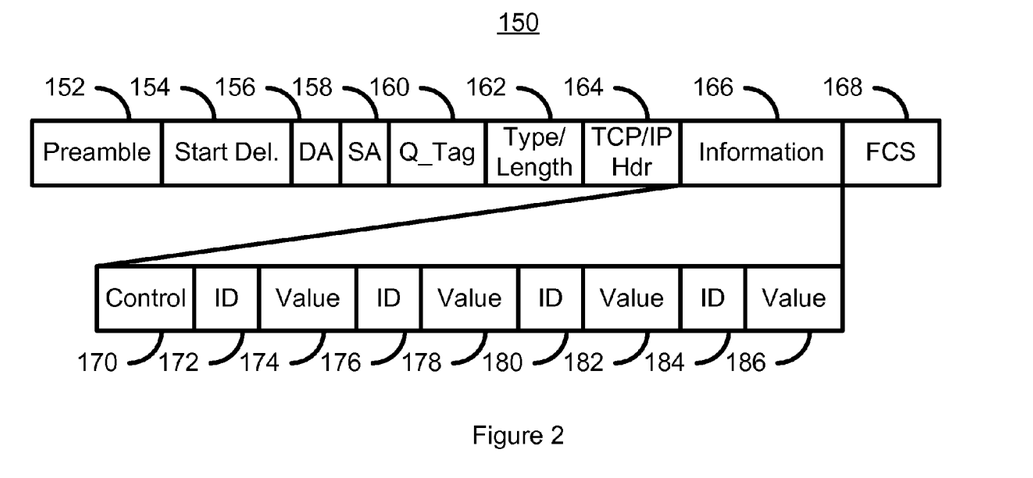
FIG. 2 is a diagram depicting a Ethernet packet.

The sensors 102' provide their data to the control station 130, preferably through a network. The control station 130 thus receives the statuses of the attributes of the complex system. The control station 130 encapsulates the statuses of the attributes into packets, preferably Ethernet packets. FIG. 2 depicts one such Ethernet packet 150 that the control station 130 might build. The Ethernet packet 150 includes the usual header fields 152, 154, 156, 158, 160, 162, and 164. In addition, the Ethernet packet includes an information field 166 and FCS filed 168 after which the Ethernet packet 150 terminates. The information field includes various subfields: control 170, field1 value 174, field2 ID 176, field2 value 178, field3 ID 180, field3 value 182, field4 ID 184, and field4 value 186, which can include the statuses from one or more sensors 102'. The control station 130 forwards these packets to the network processor 110'. In one embodiment, the control station 130 is used primarily in monitoring the statuses of the complex system. In such an embodiment, the apparatus 100' does not control components of the complex system. Instead, the apparatus 100' issues warning, alarms, or other notices. Other component(s) (not shown) would control portions of the complex system. However, in another embodiment, the apparatus 100' could actually control portions of the complex system. In such an embodiment, the control station 130 might also have other functions, such as controlling sampling rate of one or more of the sensors 102'.

The network processor 110' receives the packets from the control station 130 and builds keys using various fields of the packets. The network processor 110' may utilize one or more fields of a particular packet, as well as one or more fields of multiple packets in order to provide a key. An embedded command within the packet preferably indicates the field(s) which the network processor 110' is to use in building the key. The network processor 110' then searches the table 120' for a match to the key, and accesses the action stored in the table 120'.

In a preferred embodiment, at least some of the actions stored in entries of the table 120' are encoded. For example, a two-bit code could be used. In such an embodiment, a 00 might correspond to continuing normal operation, a 01 may correspond to providing a warning that operation of the complex system is other than desired, and a 11 may correspond to providing an alarm that a fault has been diagnosed. In such an embodiment, a warning is distinguished form an alarm in that the warning indicates that certain attributes of the complex system warrant closer observation. An alarm indicates the existence of a fault or other abnormal condition, particularly one which would adversely affect performance of the complex system. However, other actions and other codes could be used. Moreover, the encoded actions may not be explicitly defined. Instead, the actions could be interpreted by a control application (not explicitly shown), which would issue the appropriate commands to the sensors 102 or components of the complex system, provide warnings and alarms, or take other appropriate action. Such a control application might reside in the control station 130 or in another portion of the complex system, such as a system processor (not shown).

Thus, using the network processor 110' and the table 120', status information from the sensors 102' can be rapidly managed. In addition, the actions corresponding to statuses of the attributes of the complex system can be rapidly determined. Furthermore, as described above, multiple statuses (e.g. multiple fields in the packet) can be combined in the key and used to search for the appropriate action in the table 120'. As a result, a more efficient mechanism for controlling the complex system based upon combined statuses is provided. Consequently, the system 100' can effectively monitor and control a complex system.

Figure 3:
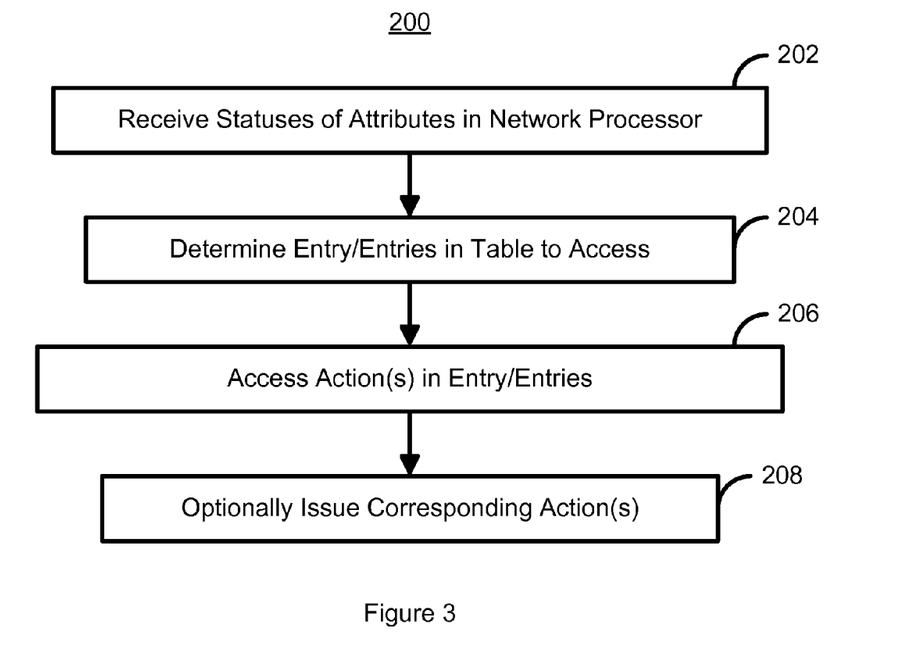
FIG. 3 is a high-level flow chart depicting one embodiment of a method in accordance with the present invention for controlling a complex system.

FIG. 3 is a high-level flow chart depicting one embodiment of a method 200 in accordance with the present invention for controlling a complex system. In a preferred embodiment, the method 200 is implemented using the system 100'. Consequently, the method 200 is described in the context of the method 100'. However, nothing prevents the method 200 from being used in another system. The method 200 preferably commences after the table 120' has been provided and the actions in the entries of the table defined.

The network processor 110' receives the statuses for attributes of the complex system from the sensors 102', via step 202. In a preferred embodiment, the network processor 110' receives the statuses via the control station 130 in the form of an Ethernet packet, such as the packet 150. The network processor 110' determines the entry or entries of the table 120' to access based upon the plurality of statuses, via step 204. In a preferred embodiment, step 204 is performed by the network processor 110' building a key and searching the entries of the table 120' for a match to the key. The entry or entries corresponding to the match(es) are accessed, via step 206. Thus, the appropriate action(s) are determined in step 206. Preferably, the corresponding action(s) are taken, via step 208. Thus, using the method 200, the complex system can be efficiently monitored and controlled.

Figure 4:
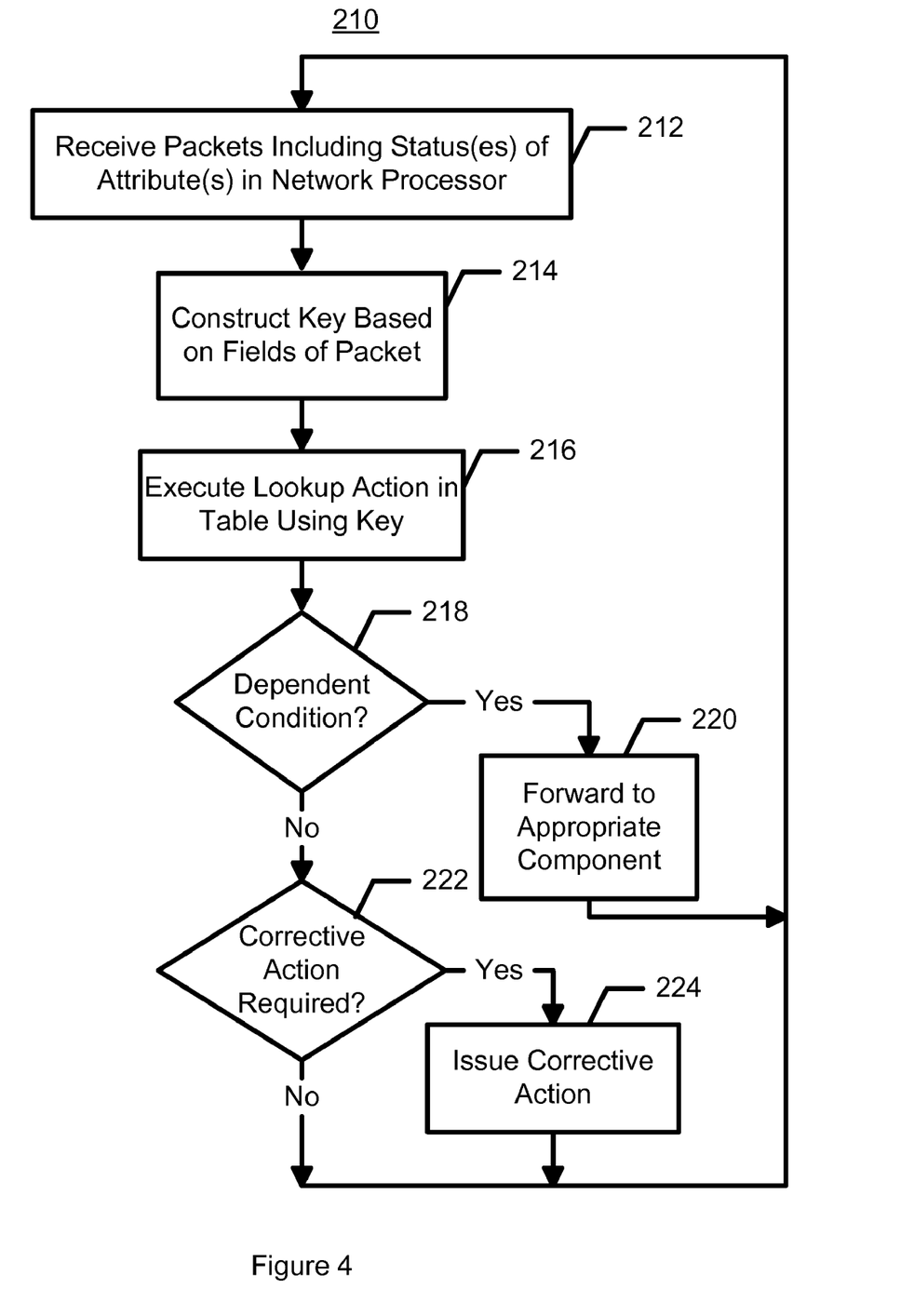
FIG. 4 is a more detailed flow chart depicting one embodiment of a method in accordance with the present invention for controlling a complex system.

FIG. 4 is a more detailed flow chart depicting one embodiment of a method 210 in accordance with the present invention for controlling a complex system. In a preferred embodiment, the method 210 is implemented using the system 100'. Consequently, the method 210 is described in the context of the method 100'. However, nothing prevents the method 210 from being used in another system. The method 210 preferably commences after the table 120' has been provided and the actions in the entries of the table defined. The method 210 is also described in the context of forming keys based upon a single packet. However, nothing prevents the use of multiple packets in forming a key.

A status frame, or packet, is received by the network processor 110', via step 212. The packet is preferably provided to the network processor 110' from the control station 130. The packet contains the status(es) of one or more attributes of the complex system. The network processor 110 constructs a key using selected field(s) of the packet, via step 214. In a preferred embodiment, the fields selected are determined by a command embedded in the packet. The network processor executes a lookup action via the table 120', via step 216. As described above, the table 120' might be in the form of a CAM table or a decision tree. Consequently, step 216 executes a lookup that is appropriate for the implementation of the table 120'. As a result, the action(s) in the entry matching the key is determined in step 216. Steps 218 and 222, described below, thus depend upon the action accessed in step 216.

It is determined whether the action(s) include a dependent condition, via step 218. As previously discussed, further analysis is performed when a dependent condition is found. Thus, if a dependent condition exists, then the appropriate data is forwarded to the corresponding component, via step 220. Preferably, the appropriate data is forwarded to a system processor. In addition, the data forwarded could include the dependent action as well as other data such as status information from another time and/or other sensors. Step 202 is then returned to. If a dependent condition does not exist, then it is determined whether corrective action is to be taken, via step 222. If not, then the next packet may be received, via step 202. If corrective action is to be taken, then the appropriate corrective action is issued, via step 224. Thus, an alarm, warning or other action may be by the apparatus 100' in step 224. Other action, such as an increase in the sampling frequency used by the sensors 102', or a change in the components of the complex system, such as an increase in speed, may also be taken using the step 224.

Figure 5:
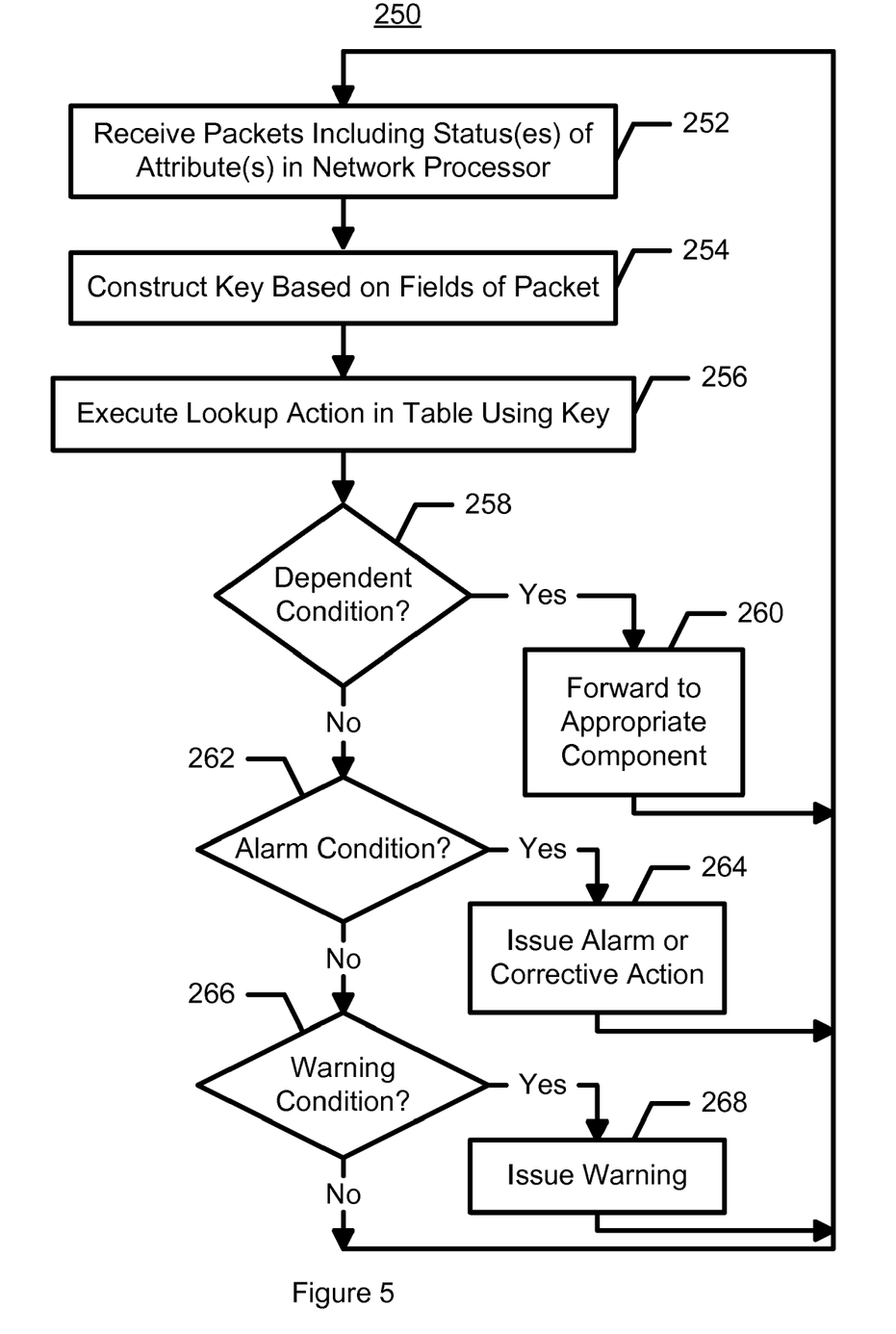
FIG. 5 is a more detailed flow chart depicting one embodiment of a method in accordance with the present invention for monitoring a complex system.

FIG. 5 is a more detailed flow chart depicting one embodiment of a method 250 in accordance with the present invention for monitoring a complex system. In a preferred embodiment, the method 250 is implemented using the system 100'. Consequently, the method 250 is described in the context of the method 100'. However, nothing prevents the method 250 from being used in another system. The method 250 preferably commences after the table 120' has been provided and the actions in the entries of the table defined. The method 250 is also described in the context of forming keys based upon a single packet. However, nothing prevents the use of multiple packets in forming a key.

A status frame, or packet, is received by the network processor 110', via step 252. The packet is preferably provided to the network processor 110' from the control station 130. The packet is preferably provided to the network processor 110' from the control station 130. The network processor 110 constructs a key using selected field(s) of the packet, via step 254. In a preferred embodiment, the fields selected are determined by a command embedded in the packet. The network processor executes a lookup action via the table 120', via step 256. As described above, the table 120' might be in the form of a CAM table or a decision tree. Consequently, step 256 executes a lookup that is appropriate for the implementation of the table 120'. As a result, the action(s) in the entry matching the key is determined in step 256. Steps 258, 262, and 266, described below, thus depend upon the action accessed in step 256.

It is determined whether the action(s) include a dependent condition, via step 258. If a dependent condition exists, then the appropriate data is forwarded to the corresponding component, via step 260. Preferably, the appropriate data is forwarded to a system processor. In addition, the data forwarded could include the dependent action as well as other data such as status information from another time and/or other sensors. Step 252 is then returned to. If a dependent condition does not exist, then it is determined whether an alarm condition exists, via step 262. If so, then the appropriate alarm or indication of the correct action is issued, via step 264. Step 252 is then returned to. If an alarm condition does not exists, then it is determined whether a warning condition exist, via step 266. As described above, a warning condition occurs when attributes of the complex system should be more closely monitored, but a fault may not exist yet. If not, then the next packet may be received, via step 202. If a warning condition exists, then the appropriate warning is issued, via step 268. Thus, an alarm, warning or other action are issued by the apparatus 100' in steps 264 and 268, respectively.

Using the methods 200, 210, and 250, and the apparatus 100 and 100', a complex system can be very efficiently monitored and controlled. The components in the complex system can be monitored and the large volume of data from sensors 102 and 102' can be rapidly and easily managed. The appropriate actions for various conditions in the attributes of the complex system can also be quickly and efficiently determined. Thus, the complex system can be better and more efficiently controlled.

For example, if the complex system is a nuclear power generation plant, the methods 200, 210, and 250, and the apparatus 100 and 100' can monitor a wide variety and large number of components. For example, pressure, temperature, and power generated at various points in the power plant can be monitored using the sensors 102 or 102'. These components can be controlled based on normal operation ranges for individual components as well as combinations of components. These normal operation ranges can be input into the table 120 or 120' in the form of keys, and the appropriate actions delineated. During operation, using the features of the network processors 110 and 100', the methods 200, 210, and 250, and the apparatus 100 and 100' can quickly determine if actions, such as opening or closing valves, are to be taken and take the appropriate action. Similarly, the methods 200, 210, and 250, and the apparatus 100 and 100' could be used in navigational in complex systems such as aircraft, spacecraft or ships. The statuses of various attributes of the complex system, such as the speed, direction, altitude, presence of currents or winds, can be closely monitored using the methods 200, 210, and 250, and the apparatus 100 and 100'. The appropriate actions determined using the methods 200, 210, and 250, and the apparatus 100 and 100' can be employed by the navigational system for improved steering of the corresponding complex system. In yet another example, the methods 200, 210, and 250, and the apparatus 100 and 100' could be used in an industrial plant. The attributes of various portions of the plant, including but not limited to boilers or other automated equipment, could be determined and the appropriate actions easily determined using the methods 200, 210, and 250, and the apparatus 100 and 100'. Thus, operators of the plant could be warned of impending failures and the appropriate action taken. Thus, the safety, performance and profitability of such complex systems may be greatly improved.

A method and system has been disclosed for more efficiently monitoring and controlling a complex system. Software written according to the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for monitoring and control of a complex system comprising:
   a plurality of sensors for monitoring a plurality of attributes of the complex system;
   a table recorded on a computer-readable medium, the table including a plurality of entries, each of the plurality of entries indicating at least one action to be taken in response to a portion of the plurality of attributes having particular values; and
   a network processor operably coupled with the plurality of sensors and with the table, the network processor for receiving from the plurality of sensors a plurality of statuses in a plurality of packets for the plurality of attributes, wherein each of the plurality of packets includes an information field, the information field includes a plurality of subfields, wherein the plurality of subfields includes the plurality of statuses from the plurality of sensors, wherein an embedded command within each packet of the plurality of packets indicates a subfield of the plurality of subfields that the network processor is to use in building a key, the network processor further for determining at least one entry of the plurality of entries to access based upon the plurality of statuses, and for accessing the at least one entry to determine a corresponding action.

2. The apparatus of claim 1 wherein the plurality of entries corresponds to a plurality of values of the key, wherein the network processor further determines at least one corresponding value of the key based upon a portion of the plurality of statuses, the network processor determining the at least one entry by determining at least one match in the plurality of entries for the at least one corresponding value of the key.

3. The apparatus of claim 2 wherein the at least one corresponding value of the key is based upon the portion of the plurality of statuses from separate sensors of the plurality of sensors.

4. The apparatus of claim 2 wherein the at least one corresponding value of the key is based upon the portion of the plurality of statuses including more than one status from a single sensor of the plurality of sensors.

5. The apparatus of claim 1 further comprising:
   a control station coupled to the plurality of sensors and the network processor, the control station receiving the plurality of statuses, placing the plurality of statuses in the plurality of packets and providing the plurality of packets to the network processor.

6. The apparatus of claim 5 wherein the control station places a portion of the plurality of statuses from separate sensors of the plurality of sensors into a packet of the plurality of packets.

7. The apparatus of claim 5 wherein the control station places a portion of the plurality of statuses into a packet of the plurality of packets, the portion of the plurality of statuses including more than one status from a single sensor of the plurality of sensors.

8. The apparatus of claim 6 or 7 wherein the packet has a plurality of status fields for storing the portion of the plurality of statuses.

9. The apparatus of claim 8 wherein the plurality of entries corresponds to a plurality of values of the key, wherein the network processor further determines at least one corresponding value of the key using a portion of the plurality of status fields, the network processor determining the at least one entry by determining at least one match in the plurality of entries for the at least one corresponding value of the key.

10. The apparatus of claim 5 wherein the plurality of entries corresponds to a plurality of values of the key, wherein the network processor further determines at least one corresponding value of the key from a portion of the plurality of packets, the network processor determining the at least one entry by determining at least one match in the plurality of entries for the at least one corresponding value of the key.

11. The apparatus of claim 1 wherein the corresponding action includes issuing an alarm or a warning.

12. The apparatus of claim 1 wherein the corresponding action includes a dependent condition and wherein the network processor provides information to a system processor for further analysis.

13. The apparatus of claim 1 wherein the corresponding action includes continuing normal operation.

14. The apparatus of claim 1 wherein the corresponding action includes using at least one of the plurality of sensors for closely monitoring a portion of the plurality of attributes.

15. The apparatus of claim 1 wherein the table includes a CAM table.

16. The apparatus of claim 1 wherein the table includes a decision tree.

17. A computer program product recorded on a computer-recordable storage medium for monitoring and control of a system, the computer program product comprising instructions for:
   receiving in a network processor a plurality of statuses in a plurality of packets for a plurality of attributes from a plurality of sensors, the plurality of sensors for monitoring the plurality of attributes of the system, wherein each of the plurality of packets includes an information field, the information field includes a plurality of subfields, wherein the plurality of subfields includes the plurality of statuses from the plurality of sensors, wherein an embedded command within each packet of the plurality of packets indicates a subfield of the plurality of subfields that the network processor is to use in building a key;
   determining at least one entry of a plurality of entries in a table to access based upon the plurality of statuses and using the network processor, each of the plurality of entries indicating at least one action to be taken in response to a portion of the plurality of attributes of the system having particular values; and
   accessing the at least one entry using the network processor to determine the at least one action.

18. The computer-readable medium of claim 17 wherein the plurality of entries corresponds to a plurality of values of the key, wherein the instructions for determining the at least one entry further includes the step of:
   determining at least one corresponding value of the key based upon a portion of the plurality of statuses; and
   determining at least one match in the plurality of entries for the at least one corresponding value of the key.

19. The computer-readable medium of claim 18 wherein the at least one corresponding value of the key is based upon the portion of the plurality of statuses from separate sensors of the plurality of sensors.

20. The computer-readable medium of claim 18 wherein the at least one corresponding value of the key is based upon the portion of the plurality of statuses including more than one status from a single sensor of the plurality of sensors.

21. The computer-readable medium of claim 18 wherein the program further includes the further comprising:

placing the plurality of statuses in the plurality of packets; and providing the plurality of packets to the network processor.

22. The computer-readable medium of claim 17 wherein the placing instructions includes the instructions for placing a portion of the plurality of statuses from separate sensors of the plurality of sensors into a packet of the plurality of packets.

23. The computer-readable medium of claim 17 wherein the instructions for placing step further includes the step of:

placing more than one status from a single sensor of the plurality of sensors.

24. The computer-readable medium of claim 22 or 23 wherein the packet has a plurality of status fields for storing the portion of the plurality of statuses.

25. The computer-readable medium of claim 24 wherein the plurality of entries corresponds to a plurality of values of the key;

wherein the corresponding valued of the key determining instructions further includes instructions for using a portion of the plurality of status fields to determine the status of the key; and wherein the at least one match determining instructions further includes instructions for of determining the at least one entry by determining at least one match in the plurality of entries for the at least one corresponding value of the key.

26. The computer-readable medium of claim 19 wherein the plurality of entries corresponds to a plurality of values of the key, wherein the at least one corresponding value of the key determining instructions further includes instructions for determining the at least one corresponding value of the key from a portion of the plurality of packets; and wherein the at least one determining instructions further includes the instructions for using the network processor to determine at least one match in the plurality of entries for the at least one corresponding value of the key.

27. The computer-readable medium of claim 17 wherein the corresponding action includes issuing an alarm or a warning.

28. The computer-readable medium of claim 17 wherein the corresponding action includes a dependent condition and wherein the network processor provides information to a system processor for further analysis.

29. The computer-readable medium of claim 17 wherein the corresponding action includes continuing normal operation.

30. The computer-readable medium of claim 17 wherein the corresponding action includes using at least one of the plurality of sensors for closely monitoring a portion of the plurality of attributes.

31. The computer-readable medium of claim 17 wherein the table includes a CAM table.

32. The computer-readable medium of claim 17 wherein the table includes a decision tree.

* * * * *